Sept. 20, 1966  L. A. FATTORI  3,274,382
PORTABLE BATTERY POWERED SAFETY LIGHT AND REFLECTOR
PLATE CONSTRUCTION THEREFOR
Filed May 1, 1964  2 Sheets-Sheet 1
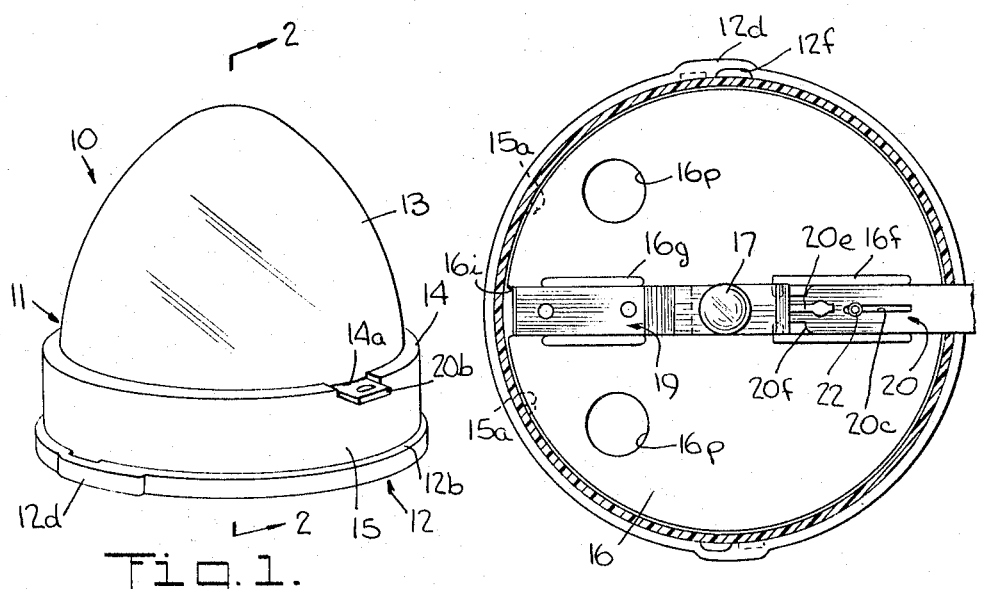
Fig.1.
Fig.3.
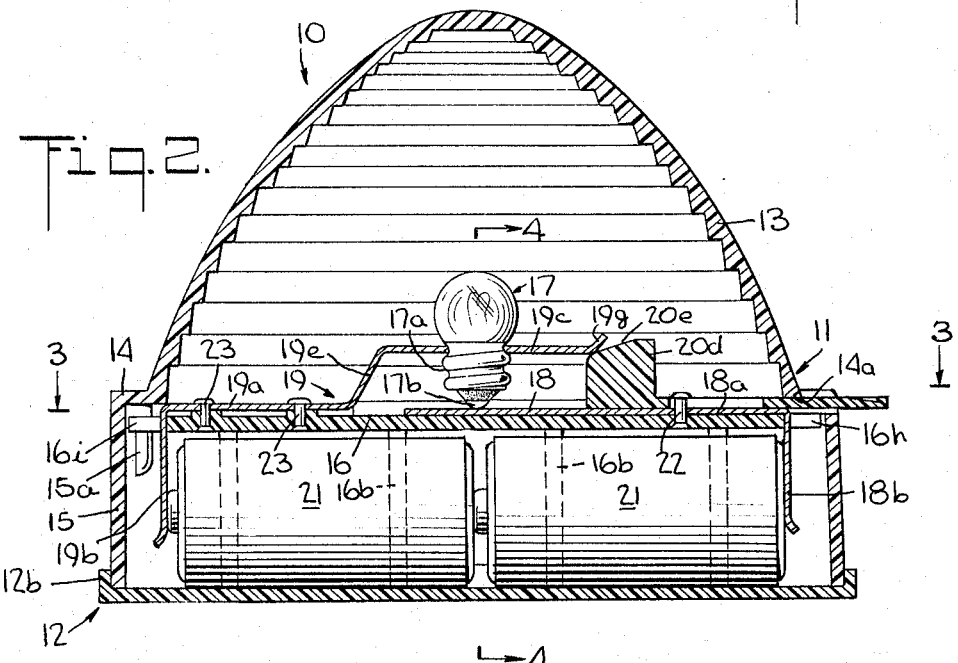
Fig.2.
INVENTOR.
LAZZARO A. FATTORI
BY
Barnett + Barnett
ATTORNEYS Sept. 20, 1966         L. A. FATTORI           3,274,382
          PORTABLE BATTERY POWERED SAFETY LIGHT AND REFLECTOR
                        PLATE CONSTRUCTION THEREFOR
Filed May 1, 1964                                 2 Sheets-Sheet 2
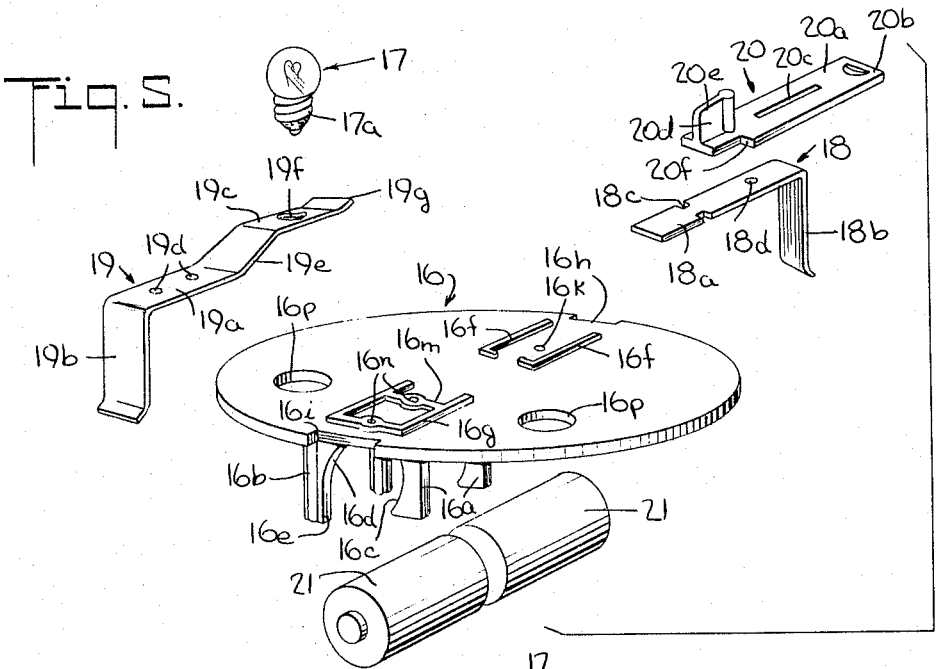
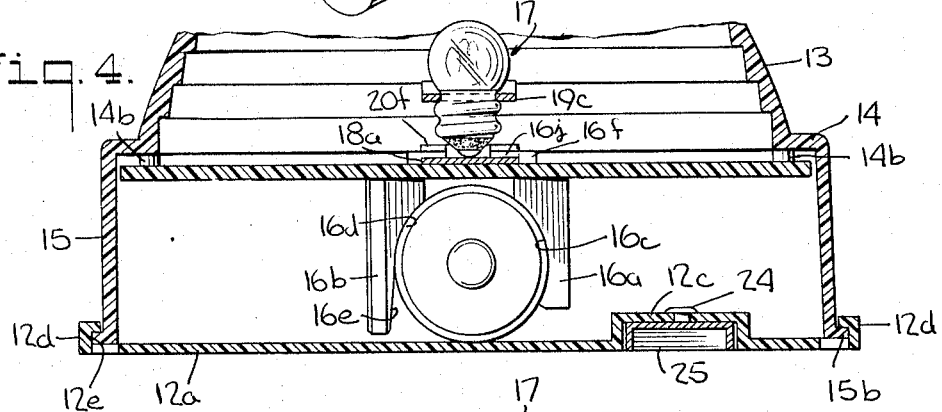
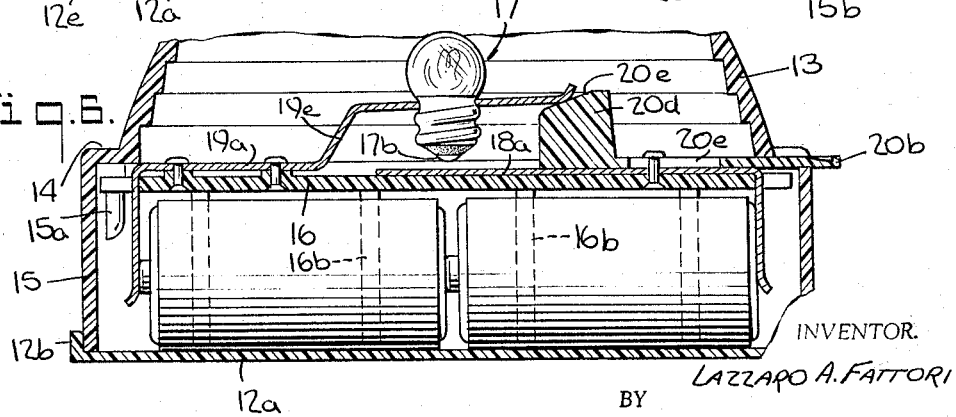
INVENTOR.
LAZZARO A. FATTORI
BY
Barnett & Barnett
ATTORNEYS

United States Patent Office 3,274,382
Patented Sept. 20, 1966

3,274,382
PORTABLE BATTERY POWERED SAFETY LIGHT AND REFLECTOR PLATE CONSTRUCTION THEREFOR
Lazzaro A. Fattori, 84 Rose Ave., Woodcliff Lake, N.J.
Filed May 1, 1964, Ser. No. 364,242
6 Claims. (Cl. 240—10.6)

This invention relates to portable battery powered illuminating devices and more particularly is directed to a lighting unit adapted for use as a flashing highway warning or safety light for motorists.

Among the objects of the invention is to generally improve safety light devices of the character described, which shall comprise few and simple parts including a housing incorporating a light transmitting dome and an interior reflector plate which may be molded of resinous plastic material, which reflector plate shall be formed in a novel manner for assembly with a minimum of additional parts to support dry cell batteries in circuit with an electric lamp and switch means interposed therebetween, which reflector plate shall position the batteries and lamp within the housing for easy accessibility and replacement, which device can be manufactured in quantity production to retail at a relatively low price yet be rugged in construction and sized and shaped to render superior performance in distance visibility, and which shall be practical and efficient to a high degree in use.

Other objects of the invention will in part be obvious and in part hereinafter pointed out.

The invention accordingly consists of features of construction, combination of elements and arrangements of parts which will be exemplified in the construction hereinafter disclosed, the scope of the application of which will be indicated in the claims following.

In the accompanying drawing in which an illustrative embodiment of the invention is shown:

FIG. 1 is a perspective view of a highway safety light constructed to embody the invention.

FIG. 2 is an enlarged vertical sectional view taken on line 2—2 in FIG. 1 showing the reflector plate mounting dry cell batteries, lamp holder and switch, the latter being shown in "closed" or "on" position.

FIG. 3 is a horizontal sectional view taken on line 3—3 in FIG. 2 showing the facing side of the reflector plate.

FIG. 4 is a fragmentary sectional view taken on line 4—4 in FIG. 2.

FIG. 5 is an exploded perspective view of the reflector plate and associated parts removed from the housing, and FIG. 6 is a fragmentary sectional view similar to FIG. 2, but showing the switch in "open" or "off" position.

Referring in detail to the drawings, 10 generally denotes a portable battery powered safety light of the type used by motorists as a highway warning signal, constructed to embody the invention, having a casing comprising an open bottom shell or housing 11, a bottom closure plate 12 and a reflector 16 all of which may be injection molded of a suitable resinous plastic material, such as polystyrene, acrylic, cellulose acetate or the like for housing 11, and including high impact polystyrene for plates 12 and 16. Housing 11 is shown as integrally formed with a dome 13 and a horizontal ledge or flange 14 interconnecting the bottom edge of dome 13 with a skirt or vertical wall 15. The reflector plate 16, positioned beneath ledge 14 and dividing the interior of housing 11 into an upper dome chamber and a lower base chamber, mounts on the upfacing or dome-facing side thereof a pair of spring metal conductors 18 and 19 and a slidable switch bar 20 and mounts dry cell batteries 21 on a downfacing or base-facing side thereof. Electric lamp 17 is mounted on conductor end portion 19c for positioning at substantially the center of reflector plate 16.

The downfacing side of reflector plate 16 may be integrally formed with snap-in retention means for batteries 21 seen to comprise four pairs of legs spaced apart and aligned along a diameter of reflector plate 16. Each pair includes legs 16a and 16b spaced from each other and having inwardly facing surfaces 16c and 16d, respectively, contoured to fit the cylindrical surface of bottery 21 for retention of the latter therebetween. As will be clear from FIGS. 4 and 5, each leg 16a has its contoured surface 16c extending as an undercut to provide for said battery retention while leg 16b has its contoured surface 16d terminating short of an undercut providing a relatively straight end surface 16e to facilitate the snap-in insertion and removal of battery 21.

One of the features of the invention is the novel mounting and arrangement of circuit conductors, lamp, switch means and batteries on the reflector plate 16 for relatively inexpensive assembly into an operative unit for ease in insertion and removal from housing 11. To this end, reflector plate 16 is integrally formed on the dome-facing side thereof with upstanding bosses 16f and 16g extending in diametric alignment with opposite peripheral cutbacks 16h and 16i. As seen in FIG. 5, boss 16f is formed as a pair of spaced apart elongated parallel guides forming a track therebetween for slidable switch bar 20, each guide terminating at its medial end in an inwardly extending stop portion 16j. An opening 16k is formed in reflector plate 16 on the center line of the track defined by boss 16f. Boss 16g includes a pair of transverse portions 16m through which spaced openings 16n in reflector plate 16 extend.

Spring metal conductors 18 and 19 have portions 18a and 19a adapted to overlie the dome-facing side of reflector 16 and also have remote end portions bent at substantially right angles to portions 18a and 19a for extending through peripheral cutbacks 16h and 16i providing resilient electrical contacts 18b and 19b, respectively, for the terminals of batteries 21 and for cooperating with integral legs 16a and 16b. Conductor portion 18a is sized to extend from cutback 16h, along the bottom of the track defined by boss 16f and beyond boss stop portions 16j to the center of reflector plate 16 located beneath the oppositely extending lamp mounting end portion 19c of conductor 19. Conductor portion 18a may be formed with notches 18C for accommodating boss stop portions 16j and also formed with opening 18d for registering with reflector plate opening 16k, portion 19a having a pair of spaced openings 19d registering with openings 16n through which a pair of rivets 23 extend fastening conductor 19 to reflector plate 16. The lamp mounting end portion 19c of conductor 19 is upwardly offset from portion 19a by an intermediate portion 19e to normally extend substantially parallel to and spaced a predetermined distance above the surface of reflector plate 16 and the free end of conductor portion 18a. Lamp mounting end 19c is formed with an opening 19f suitably shaped and sized to receive therein the threaded base ferrule 17a of lamp 17 and terminates in an upwardly bent flange 19g to facilitate engagement of the underside of end portion 19c with the inclined surface 20e of switch bar boss 20d as is clear from FIGS. 2 and 6.

Slidable switch bar 20, which may also be molded of a plastic resinous material similar to reflector plate 16, is seen to comprise an elongated flat base 20a sized to slidably fit the track defined by boss 16f and having a manipulating end 20b projecting beyond an opening 14a in housing 11 at ledge 14. An elongated slot 20c extends along a midportion of base 20a for receiving therethrough rivet 22 which also extends through reflector plate opening 16k and conductor opening 18d. The inner end of switch bar base 20a opposite manipulating end 20b is reduced in width to fit between stop portions 16j providing shoulders 20f which abut the latter when switch bar 20 is in its extreme "off" position. Said inner end is formed with upstanding medial boss 20d having inclined top surface 20e forming a wedge for raising lamp mounting end 19c against the resiliency of conductor 19 to open the circuit between conductor 18 and center terminal 17b of lamp 17 upon inward radial movement of switch bar 20.

As best seen in FIG. 4, the interior side of ledge 14 may be integrally formed with equally spaced downwardly projecting spacers 14b against which the dome-facing side of reflector plate 16 abuts. Spacers 14b position reflector plate 16 so that switch bar 20 registers with opening 14a and, the edge portions of reflector plate 16 on opposite sides of cutback 16i snaps into engagement to seat on rib projections 15a, the latter being integrally formed on the interior of skirt 15. Large openings 16p suitably sized and spaced for finger grip insertion may be formed in reflector plate 16 for the purpose hereinafter more fully described.

Bottom closure plate 12 is molded as a dish-shaped structure having a flat bottom wall 12a and a peripheral side wall or upstanding flange 12b. A recessed seat 12c may be formed in bottom wall 12a for mounting therein, substantially flush with the bottom surface of wall 12a, a permanent magnet 24 of any well known construction. Suitable securing means for magnet 25 may be used, such as, rivet 24 which extends through an opening pre-formed in seat 12c.

Any suitable means may be provided for removably securing bottom closure plate 12 to the bottom opening of housing 11, as for example, by a bayonet-type joint comprising a pair of tongues 15b which may be diametrically located and integrally formed to project laterally from the bottom edge of skirt 15 and a pair of grooves 12e formed in thickened portions 12d of flange 12b to receive tongues 15b. Cutouts 12f in the upfacing wall of thickened portions 12d are provided for inserting tongues 15b into grooves 12e.

The practical utility of the invention will now be apparent. The parts are constructed as above described and shown in FIG. 5 with housing 11, bottom closure plate 12, reflector plate 16 and switch bar 20 molded of resinous plastic material, conductors 18 and 19 stamped and formed of suitable spring metal, batteries 21 being conventional size "D," 1.5 volt dry cells and electric lamp 17 being preferably a conventional intermittent flasher type having a bi-metallic temperature sensitive bar associated with the filament and incorporated in the glass envelope.

The assembly of the parts on reflector plate 16 into a functional lighting unit is readily accomplished by positioning conductor 18 and switch bar 20 so that opening 18d and slot 20c register with opening 16k, positioning conductor 19 so that openings 19d register with openings 16n and applying rivets 22 and 23 therethrough. Riveting is facilitated by using rivets of identical size for rivets 22 and 23, this being accomplished by the provision of boss 16g which extends a predetermined distance above the surface of reflector plate 16 corresponding substantially to the thickness of switch bar base 20a. Thereafter lamp 17 is screw threaded into opening 19f, the rim edge of which is properly shaped for this purpose. With switch bar 20 in "off" position, that is, radially retracted so that medial boss 20d raises conductor lamp mounting end portion 19c to open the circuit between lamp center terminal 17b and conductor horizontal portion 18a, batteries 21 may then be inserted in series between legs 16a and 16b by sliding each battery 21 along the straight end surfaces 16e of two of the legs 16b and exerting a slight pressure to snap each battery into position. When properly seated, as shown in FIGS. 2 and 6, the positive terminal of one of batteries 21 will make contact with either one of the electrical contacts 18b and 19b while the negative terminal of the other of batteries 21 will make contact with the other of the contacts 18b and 19b.

The operation of the functional lighting unit may now be checked by sliding switch bar 20 radially outwardly to the "on" position shown in FIG. 2, wherein boss 20d is disengaged from beneath conductor end portion 19c, the normal resiliency of conductor 19 bringing lamp center terminal 17b into electrical contact with conductor horizontal portion 18a, closing the circuit to batteries 21 and lighting lamp 17. Returning switch bar 20 to the "off" position, the functional lighting unit is readily placed into housing 11 through its open bottom by first hand gripping reflector plate 16 by inserting the thumb and index finger of one hand into large openings 16p, the battery side of reflector plate 16 facing the hand, inserting switch bar manipulating end 20b which projects beyond the edge of reflector plate 16 into openings 14a and then snapping the opposite edge of reflector plate 16 into position over rib projections 15a.

Assembly of safety light 10 is completed by securing bottom closure plate 12 to housing 11. This may be facilitated by holding closure plate 12 in the palm of one hand with its interior side facing up and with the other hand bringing housing 11 to seat therein by inserting tongues 15b into cutouts 12f and then rotating housing 11 in a counter clockwise direction with respect to closure plate 12 to lock tongues 15b in grooves 12e as will be clear from FIGS. 3 and 4. The dimensions of skirt 15 and the positioning of reflector plate 16 in housing 11 may be such as to cause slight projection of batteries 21 beyond the plane of the open bottom end of housing 11 requiring the exertion of a light pressure to properly engage tongues 15b in grooves 12e whereby a tight fit is provided for the bayonet joint.

Housing 11 may be molded of a translucent plastic either red or amber in color, it having been found desirable to provide the motorist with a pair of safety lights 10, one in red and the other in amber to be placed at spaced distances from the disabled car in the direction of approaching traffic. Where required, safety light 10 may be placed on the car, magnet 25 serving to retain it to any curved or sloping surface of the car body.

Batteries 21 are readily replaced by removing bottom closure plate 12, which may best be accomplished by holding safety light 10 upright in the palm of one hand and with the other hand grasping and rotating housing 11 in a clockwise direction with respect to closure plate 12 to align tongues 15d with cutouts 12f for disengagement of the bayonet joint. Then turning housing 11 upside down, the underside of reflector plate 16 is accessible for snap-in removal and replacement of batteries 21. Should lamp 17 require replacement, reflector plate 16 is removed from housing 11 by gripping same through large openings 16p with thumb and index finger and pulling up reflector plate 16 to disengage rib projections 15a. It will be apparent from FIG. 3 that openings 16p are positioned relatively close to rib projections 15a and remote from opening 14a to facilitate this disengagement prior to slipping switch bar manipulating end 20b from opening 14a to free reflector plate 16 for access to lamp 17. Safety light 10 is reassembled in the manner hereinbefore described.

As will be clear from FIGS. 2 and 6, the "on," "off" switch arrangement substantially eliminates the possibility of accidental closure of the circuit when safety light 10 is in the trunk of a car due to contact with other articles or vibration and jolting when the car is in motion. In the "off" position, switch bar manipulating end 20b is retracted into housing 11 relative to its "on" position and lamp center terminal 17b is positively retained out of electrical contact with conductor horizontal portion 18a by means of medial boss 20d.

Reflector plate 16 and switch bar 20 may be molded of a light color plastic for maximum light reflecting properties. When high impact polystyrene is used an opaque white color has been found to render satisfactory results.

It is thus seen that there is provided an improved portable battery powered safety light and reflector plate construction therefor whereby the several objects of this invention are achieved and which is well adapted to meet the conditions of practical use.

As various possible embodiments might be made of the above invention, and as various changes might be made in the embodiment above set forth, it is to be understood that all matters herein set forth or shown in the accompanying drawing are to be interpreted as illustrative and not in a limiting sense.

Having thus described my invention, I claim as new and desire to secure by Letters Patent:

1. A portable battery powered safety light having a two-piece casing of molded plastic comprising a light transmitting dome-shaped housing open at a bottom thereof and fitted with a removable bottom closure plate, a reflector plate of molded plastic mounted in said housing spaced above said bottom closure plate and having a dome-facing surface and an opposite bottom-facing surface, the latter having snap-in battery supporting means, a battery mounted in said supporting means, said dome-facing surface mounting a lamp, a switch and conductor elements to the battery, said switch having operating means extending through an opening in said housing, said reflector plate, battery, lamp and switch forming an operative removable unit, the latter being removable through said housing open bottom upon removal of said closure plate, and means cooperating with said housing and reflector plate for snap-in removal and retention of the latter in said mounted position in the housing.

2. The portable safety light defined in claim 1 in which said housing is formed as a stepped structure having an upper dome and a lower skirt inter-connected by a horizontal ledge, said reflector plate being mounted in said skirt beneath said ledge with the lamp positioned within the dome.

3. A portable battery powered safety light having a two-piece casing of molded plastic comprising a dome-shaped housing open at a bottom thereof and fitted with a removable bottom closure plate, said housing being formed as a stepped structure having an upper light transmitting dome and a lower skirt inter-connected by a horizontal ledge, a reflector plate of molded plastic mounted in said skirt adjacent said ledge, and having a dome-facing surface and an opposite bottom facing surface, the latter being integrally formed with depending legs for snap-in battery support, said legs being located to dispose a pair of dry cell batteries in series end to end contact along a diameter of the reflector plate, a pair of spring metal conductors mounted on said reflector plate having ends bent to extend downwardly from said reflector bottom-facing surface to resiliently contact terminals of said batteries, a first of said conductors having an opposite end portion spaced above the reflector plate dome-facing surface, an electric lamp having a ferrule base terminal and a center terminal, said ferrule base terminal being mounted in an opening in said first conductor end portion with said center terminal contacting an opposite end portion of a second of said conductors to close the circuit for energizing the lamp, and a switch bar slidably mounted on said reflector plate for deflecting said first conductor end portion against the resiliency thereof to break said center terminal contact and open the circuit to the lamp, said switch bar having a manipulatable end extending through an opening in said housing in the region of said ledge.

4. A reflector plate for a battery powered light comprising a flat disc integrally molded of resinous plastic material having a plurality of pairs of legs projecting from a first surface of the disc, said pairs of legs being spaced apart and aligned along a diameter thereof forming snap-in retention means for a pair of dry cell batteries, cutouts on opposite edges of said disc aligned on said diameter, a pair of spring metal conductors riveted onto said opposite surface to lie substantially along said diameter in overlapping relation at the center of the disc and having opposite ends bent to extend through said cutouts to resiliently contact terminals of said batteries, a first of said conductors having the overlapping portion spaced from the other conductor, an electric lamp having a ferrule base terminal and center terminal, said ferrule base terminal being mounted in an opening in said first conductor overlapping portion with said center terminal contacting an underlying end portion of the other conductor to close the circuit for energizing the lamp, and a switch bar slidably mounted on said reflector plate for deflecting said first conductor overlapping portion against the resiliency thereof to break said center terminal contact and open the circuit to the lamp.

5. The reflector plate defined in claim 4 in which a boss is integrally formed on said opposite disc surface for guiding said switch bar, the latter having an elongated slot through which one of said rivets extend serving as said mounting and a manipulatable end extending beyond the periphery of the disc.

6. A reflector plate for a battery powered light comprising a flat disc integrally molded of resinous plastic material and formed with cutouts on opposite edges aligned along a diameter, a pair of spring metal conductors riveted onto a surface of the disc to lie substantially along said diameter in overlapping relation at the center of the disc and having opposite ends bent to extend through said cutouts to resiliently contact battery end terminals positioned beyond an opposite surface of the disc, a first of said conductors having the overlapping portion spaced from the other conductor, an electric lamp having a ferrule base terminal and center terminal, said ferrule base terminal being mounted in an opening in said first conductor overlapping portion with said center terminal contacting an underlying end portion of the other conductor to close the circuit from the battery to the lamp, and a switch bar slidably mounted on said reflector plate for deflecting said first conductor overlapping portion against the resiliency thereof to break said center terminal contact and open the circuit to the lamp, a boss integrally formed on said disc surface for guiding said switch bar, the latter having an elongated slot through which one of said rivets extend serving as said mounting and a manipulatable end extending beyond the periphery of the disc.

References Cited by the Examiner

UNITED STATES PATENTS

| | | | |
|---|---|---|---|
| 2,695,355 | 11/1954 | Giusto | 240—10.6 |
| 2,753,442 | 7/1956 | Siswell | 240—10.65 X |
| 2,785,289 | 3/1957 | Seiss | 240—10.68 |
| 2,971,082 | 2/1961 | Frank | 240—6.4 X |
| 2,978,696 | 4/1961 | Keller et al. | 240—6.4 X |

FOREIGN PATENTS 468,371    6/1937    Great Britain.

NORTON ANSHER, Primary Examiner.

J. F. PETERS, Assistant Examiner.